US010112225B2

United States Patent
Sehl

(10) Patent No.: US 10,112,225 B2
(45) Date of Patent: Oct. 30, 2018

(54) METHOD FOR REDUCING THE ENERGY CONSUMPTION OF A ROLLING MILL INSTALLATION, CONTROL AND/OR REGULATION DEVICE FOR A ROLLING MILL INSTALLATION, MACHINE-READABLE PROGRAM CODE, STORAGE MEDIUM AND A ROLLING MILL INSTALLATION

(75) Inventor: Jürgen Sehl, Mönchengladbach (DE)

(73) Assignee: PRIMETALS TECHNOLOGIES GERMANY GMBH, Erlangen (DE)

( * ) Notice: Subject to any disclaimer, the term of this patent is extended or adjusted under 35 U.S.C. 154(b) by 697 days.

(21) Appl. No.: 13/993,354

(22) PCT Filed: Dec. 6, 2011

(86) PCT No.: PCT/EP2011/071913
§ 371 (c)(1),
(2), (4) Date: Jun. 12, 2013

(87) PCT Pub. No.: WO2012/080038
PCT Pub. Date: Jun. 21, 2012

(65) Prior Publication Data
US 2013/0276496 A1 Oct. 24, 2013

(30) Foreign Application Priority Data
Dec. 14, 2010 (EP) .................................... 10194906

(51) Int. Cl.
*B21B 37/46* (2006.01)
*G05B 15/02* (2006.01)

(52) U.S. Cl.
CPC .............. *B21B 37/46* (2013.01); *G05B 15/02* (2013.01)

(58) Field of Classification Search
CPC ......... B21B 37/00; B21B 37/46; G05B 15/00; G05B 15/02
See application file for complete search history.

(56) References Cited

U.S. PATENT DOCUMENTS

| 4,728,874 A | 3/1988 | Kuramoto | 318/571 |
| 7,343,353 B1 | 3/2008 | Wu et al. | 705/400 |

FOREIGN PATENT DOCUMENTS

| CN | 2688406 Y | 3/2005 | B21B 39/06 |
| GB | 2175417 A | 11/1986 | B21B 37/00 |

(Continued)

OTHER PUBLICATIONS

European Search Report, Application No. 10194906.3, 6 pages, dated Apr. 6, 2011.

(Continued)

*Primary Examiner* — Teresa M Ekiert
(74) *Attorney, Agent, or Firm* — Slayden Grubert Beard PLLC

(57) ABSTRACT

A method is disclosed for reducing the energy consumption of a rolling-mill installation including a one-piece or multi-piece rolling train as well as further electrical installation components which are connected to the rolling train in terms of process technology, wherein the operation of the rolling train is stopped during an unplanned rolling pause on account of a failure, and at least one of the further installation components is automatically powered down into an energy-saving mode during the rolling pause, and wherein the type of fault is identified and the likely duration of the rolling pause is determined on the basis of the type of fault.

13 Claims, 1 Drawing Sheet

(56) References Cited

FOREIGN PATENT DOCUMENTS

| RU | 2128366 C1 | 3/1999 | ............... G07F 9/02 |
| WO | 2012/080038 A1 | 6/2012 | ............. G05B 15/02 |

OTHER PUBLICATIONS

International Search Report and Written Opinion, Application No. PCT/EP2011/071913, 13 pages, dated Feb. 23, 2012.
Chinese Office Action, Application No. 2011800599953, 14 pages, dated Dec. 2, 2014.
Sinjagin, N.N. "Construction of a Scheduled Preventive Maintenance for Equipment and Networks Operating Electronics", Moskow, Energija, 9 pages (Russian w/ English translation), 1978.

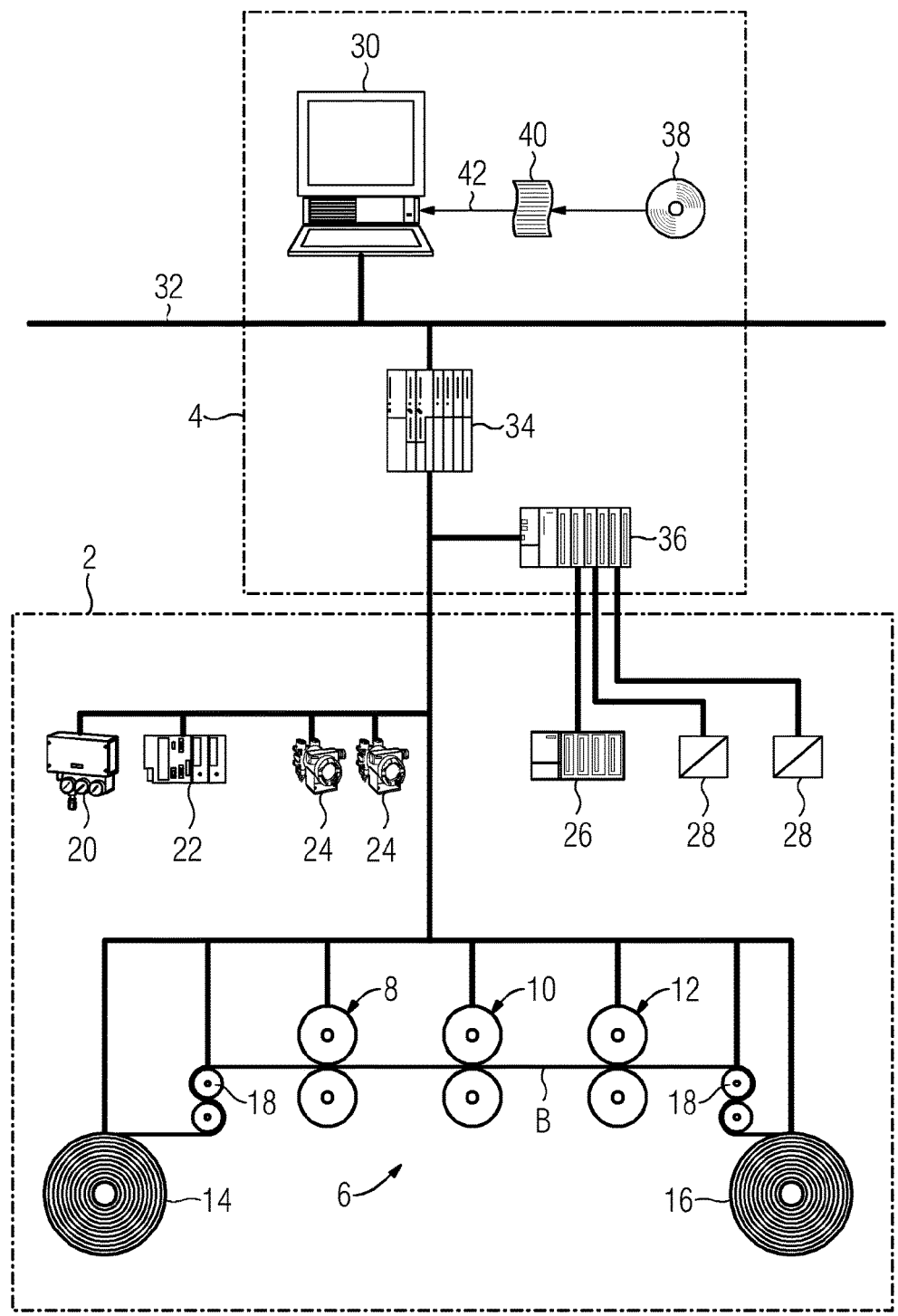

METHOD FOR REDUCING THE ENERGY CONSUMPTION OF A ROLLING MILL INSTALLATION, CONTROL AND/OR REGULATION DEVICE FOR A ROLLING MILL INSTALLATION, MACHINE-READABLE PROGRAM CODE, STORAGE MEDIUM AND A ROLLING MILL INSTALLATION

CROSS-REFERENCE TO RELATED APPLICATIONS

This application is a U.S. National Stage Application of International Application No. PCT/EP2011/071913 filed Dec. 6, 2011, which designates the United States of America, and claims priority to EP Patent Application No. 10194906.3 filed Dec. 14, 2010. The contents of which are hereby incorporated by reference in their entirety.

TECHNICAL FIELD

This disclosure relates to a method for reducing the energy consumption of a rolling mill installation. The disclosure further relates to a control and/or regulation device for a rolling mill installation, a machine-readable program code for such a control and/or regulation device, a storage medium with machine-readable program code stored thereon as well as a rolling mill installation comprising such a control and/or regulation device.

BACKGROUND

It is known from the prior art, for example from GB 2175417A that the energy consumption of the rolling mill can be reduced in planned pauses, for example when loading a new rolling piece, during operation of a rolling mill.

Rolling pauses of different lengths occur during operation in both hot rolling mills and cold rolling mills. Such rolling pauses can be unplanned, for example on account of roll replacements, lack of primary material, strip breakages or electrical or mechanical faults. The further installation components of the rolling stands are generally not shut off during the unplanned rolling pauses. The further installation components therefore consume large quantities of energy even during non-productive rolling pauses, thereby incurring the corresponding costs. The further installation components are generally only shut off manually by rolling managers at their discretion during long rolling pauses. Because shutting off is complicated, interventions generally only take place for individual, easy to operate installation parts.

Installation components here refer to for example secondary installations or secondary units, such as extractor fans, hydraulic systems, heating systems, ventilation systems, lubrication systems or drive systems, automation devices, sensors or measuring devices used in the rolling mill installations. The installation components are electrically driven and guarantee or assist the operation of the rolling installation or the individual rolling stands; in other words the further installation components can be auxiliary operations of the components of the rolling train.

SUMMARY

One embodiment provides a method for reducing the energy consumption of a rolling mill installation comprising a one-piece or multi-piece rolling train as well as further electrical installation components which are connected to the rolling train in terms of process technology, wherein the operation of the rolling train is stopped during an unplanned rolling pause on account of a failure and at least one of the further installation components is automatically powered down into an energy-saving mode during the rolling pause and wherein the type of fault is identified and the probable duration of the rolling pause is determined as a function of the type of fault.

In a further embodiment, the installation components are powered down into energy-saving mode by shutting them off.

In a further embodiment, the installation components are powered down into energy-saving mode by reducing their power consumption.

In a further embodiment, the installation components are the type through which a mass flow is conveyed and such installation components are powered down into energy-saving mode by reducing the quantities conveyed through them.

In a further embodiment, the installation components to be switched to energy-saving mode are determined taking into account the duration of the rolling pause and the duration of the time required to power the installation components down and up.

In a further embodiment, a number of installation components are powered down and up automatically by a single control command.

In a further embodiment, the installation components that are in energy-saving mode are powered up automatically at the end of the rolling pause.

Another embodiment provides a control and/or regulation device for a rolling mill installation, comprising a machine-readable program code, which contains control commands which prompt the control and/or regulation device to perform any of the methods disclosed above during their execution.

Another embodiment provides a machine-readable program code for a control and/or regulation device for a rolling mill installation, the program code stored in non-transitory computer readable media and containing control commands which prompt the control and/or regulation device to perform any of the methods disclosed above.

Another embodiment provides a non-transitory storage medium storing such a machine-readable program code.

Another embodiment provides a rolling mill installation, comprising a control and/or regulation device as disclosed above.

BRIEF DESCRIPTION OF THE DRAWINGS

An exemplary embodiment is described below with reference to FIG. 1, which shows a schematic diagram of an example rolling mill installation for cold rolling a metal strip.

DETAILED DESCRIPTION

Embodmients of the present invention may utilize the energy-saving potential of a rolling mill installation to the maximum during a rolling pause.

For example, some embodiments provide a method for reducing the energy consumption of a rolling mill installation comprising a one-piece or multi-piece rolling train as well as further electrical installation components which are connected to the rolling train in terms of process technology, wherein the operation of the rolling train is stopped during an unplanned rolling pause on account of a failure and at least one of the further installation components is automatically powered down into an energy-saving mode during the rolling pause and wherein the type of fault is identified and the probable duration of the rolling pause is determined as a function of the type of fault.

Some embodiments are based on the idea of adapting the operating state of the further installation components to the operating state of the rolling train. In the event of a failure that results in an unplanned rolling pause, as many of the further installation components as possible are therefore automatically powered down into energy-saving mode at the same time as the rolling train is shut off or immediately thereafter.

Immediately after the fault occurs, the type of fault is identified and the probable duration of the rolling pause is determined as a function of the type of fault. The reason for the fault or the type of fault is identified for example by a rolling manager and fed to a control and/or regulation device. Once the type of fault is established, the control and/or regulation device can determine the probable duration of the rolling pause for the specific fault for example based on already captured empirical data.

This means that the powering down of the installation components during the rolling pause is decoupled from the subjective estimation of the rolling manager and the procedure in the event of failures is standardized as it is characterized by a high degree of automation. Automation means that possible errors due to manual shutting off, which can cause damage to installation parts or additional downtime, are avoided and the rolling mill installation is shut off to the technological maximum under the given circumstances.

The proposed method for reducing energy consumption is also characterized by an increase in the useful life of the installation components, due to reduced operating times and a reduction in the quantities of $CO_2$ in energy-saving mode. This results in a reduction in unit costs. This manner of saving energy can be employed by adjusting the control software in existing automation systems without major outlay even in existing rolling mill installations.

The powering down of the installation components into energy-saving mode can take place in a number of ways. According to one preferred embodiment the installation components are powered down into energy-saving mode by shutting them off so that they do not consume power. According to a further, alternative embodiment the power to the installation components is simply reduced in energy-saving mode, in other words the installation components are in standby mode. Standby mode here refers to a waiting state of the installation components, in which their useful function is temporarily deactivated, but can be reactivated at any time and without any preparation or lengthy waiting times. Only minimal energy is consumed in standby mode compared with full use. If the installation components are the type through which a mass flow is conveyed, such installation components are expediently switched to standby mode by reducing the quantities conveyed through them.

Examples of the powering down of installation components into energy-saving mode are:
shutting off the motor and rectifier cooling systems as a function of winding and device temperature,
reducing the quantities and pressures conveyed by hydraulic and pneumatic systems,
reducing the quantities conveyed by extractor fans,
reducing the throughflow through water cooling systems/heating systems/circulation pumps for hydraulic systems and roll lubricants,
shutting off the magnetization of the main drives,
shutting off the spraying/blowing systems, and
shutting off transport facilities or roll tracks.

In a further embodiment the installation components to be switched to energy-saving mode are automatically determined taking into account the duration of the rolling pause and the duration of the time required to power the installation components down and up. If for example the rolling pause resulting from the fault lasts a number of minutes to hours, most and in particular all of the further installation components are powered down into energy-saving mode as the time required to power the installation components down and up is shorter than the rolling pause in this instance. However if the probable duration of the rolling pause is only a few minutes, only the installation components that can be powered down and up relatively quickly and without complication are switched to energy-saving mode.

A number of installation components and in particular all installation components that are switched to another energy state are expediently powered down and up by a single control command. Once the rolling manager has input the type of fault, the control and/or regulation device automatically determines the duration of the rolling pause and which installation components are to be powered down and also automatically switches them to energy-saving mode. The control command for powering down the selected installation components is therefore triggered by inputting the type of fault.

According to one embodiment provision is also made for the installation components that are in energy-saving mode to be powered up automatically with the rolling train at the end of the rolling pause. The installation components are hereby powered up in particular at the same time as or immediately before or after the resumption of operation of the rolling stands as a function of the technological requirements of the rolling process or the rolling train.

Other embodiments provide a control and/or regulation device for a rolling mill installation, comprising a machine-readable program code, which contains control commands which prompt the control and/or regulation device to perform the method during their execution.

Other embodiments provide a machine-readable program code for such a control and/or regulation device for a rolling installation, the program code containing control commands which prompt the control and/or regulation device to perform the method. The object is also achieved by a storage medium having such a machine-readable program code stored thereon.

Still other embodiments provide a rolling mill installation comprising such a control and/or regulation device.

An exemplary embodiment is described in more detail based on FIG. 1, which shows a schematic diagram of a rolling mill installation 2 for cold rolling a metal strip B. The rolling installation 2 is assigned a control and/or regulation device 4, which is simply designated as a regulation device 4 for reasons of simplicity. The rolling mill installation 2 also comprises a rolling train 6 having a number of rolling stands, in the illustrated exemplary embodiment three rolling stands 8, 10, 12. Provided at the start and end respectively of the rolling train 6 in the illustrated exemplary embodiment are reels—a pay-off reel 14 and a pay-on reel 16—for the metal strip B. An S roll 18 is disposed in an entry region and exit region respectively of the rolling train 6. The S rolls 18 guide the metal strip and maintain its internal tensile stresses.

The rolling mill installation 2 also comprises further electrical installation components, such as cooling facilities, hydraulic and pneumatic systems, extractor fans, heating systems, pumps and various sensors and actuators. The FIGURE only shows some of the sensors and actuators 20, 22, 24, 26, 28.

The rolling mill installation 2 is activated by way of the regulation device 4. The regulation device 4 comprises an operating computer 30, which is connected in terms of data technology to an automation device 34 by way of an industrial Ethernet bus 32. Parts of the rolling mill installation 2 can be operated by way of the operating computer 30. The various actuators or sensors 20, 22, 24, 26, 28 are connected in terms of data technology to the automation device 34. A decentralized peripheral unit 36 is also connected to the automation device 34. Some of the actuators or sensors 26, 28 can be activated or evaluated by way of the automation device 34 by way of the decentralized peripheral unit 36.

The regulation device 4 is also assigned a machine-readable program code 40 containing control commands 42 and stored on a storage medium 38, such as a hard drive or CD.

Commands for switching on and shutting off or powering up and down are output by way of the regulation device 4 to the rolling stands 8, 10, 12, the reels 14, 16, the S rolls 18 and the further installation components 20 to 28.

If for example one of the rolling trains 6 fails due to a fault, the further installation components 20 to 28 are also switched to an energy-saving mode. Some of these installation components are shut off so that they do not consume any power. Other installation components are switched to a standby mode, in which their power consumption is reduced compared to normal operation. In the case of extractor fans, cooling facilities, heating systems, ventilation systems and pumps, the quantities conveyed through said installation components for example are reduced so that less energy is consumed.

The powering down of the installation components 20 to 28 takes place as follows:

As soon as the fault occurs, with the result that the rolling operation cannot be continued under normal conditions, the entire rolling train 6 is stopped. The type of fault or the reason for the fault is then identified, in particular by a rolling manager. The rolling manager inputs the type of fault to the regulation device 2 by way of the operating computer 30. The regulation device 2 uses a database, which is structured for example in the manner of a fault matrix, to determine a probable duration of the rolling pause based on the type of fault. The installation components 20 to 28, which take a shorter time to power down and up than the rolling pause, are then automatically powered down into energy-saving mode. A number of installation components 20 to 28 are then powered down at the same time as the rolling stands 8, 10, 12, the reels 14, 16 and the S rolls 18 by a single control command 42, which is triggered by inputting the type of fault.

When the fault has been eliminated, the installation components 20 to 28, which are in energy-saving mode, are automatically taken back into operation with the rolling train as a function of the technological requirements of the rolling process or the rolling train 6. By automating the shutting off of the installation components 20 to 28 in the event of unplanned rolling pauses, it is therefore possible to identify the full savings potential of the individual installation components 20 to 28 and utilize it consistently. The high degree of automation of this operation means that an optimum selection is made as to which installation components 20 to 28 are powered down, so that as well saving a maximum amount of energy, the useful life of the installation components 20 to 28 is also increased.

What is claimed is:

1. A method for controlling a rolling mill installation comprising a rolling train and a plurality of additional installation components associated with the rolling train, the method comprising:
    rolling a strip through the rolling train;
    monitoring the rolling train and the plurality of additional installation components for a fault occurrence;
    stopping the operation of the rolling train in response to a fault occurrence;
    identifying a type of fault corresponding to the fault occurrence causing an unplanned rolling pause, the type of fault including one or more of: a roll replacement, a strip breakage, an electrical fault, and a mechanical fault;
    determining a probable duration of the unplanned rolling pause corresponding to the type of fault identified by an automatic control device storing empirical data captured in previous fault occurrences;
    wherein the plurality of additional installation components includes one or more of: extractor fans, hydraulic systems, heating systems, ventilation systems, lubrication systems, drive systems, automation devices, sensors, and measuring devices;
    automatically selecting one or more of the plurality of additional installation components to power down based at least in part on the probable duration of the rolling pause and an expected time for power down and power up of the respective installation component with the control device; and
    automatically powering down the selected one or more additional installation components with the control device.

2. The method of claim 1, comprising powering down the selected one or more installation components into energy-saving mode by shutting them off.

3. The method of claim 1, comprising powering down the selected one or more installation components into energy-saving mode by reducing their power consumption.

4. The method of claim 3, wherein a mass flow is conveyed through the selected one or more installation components, and wherein the method comprises powering down the selected one or more installation components into energy-saving mode by reducing the mass flow conveyed through them.

5. The method of claim 1, comprising automatically powering at least one of the selected one or more additional installation components down and up using a single control command.

6. The method of claim 1, comprising automatically powering up the selected one or more installation components that are in energy-saving mode at the end of the rolling pause.

7. A rolling mill installation, the rolling mill comprising:
    a one-piece or multi-piece rolling train;
    a plurality of additional installation components associated with the rolling train, the plurality of additional installation components including one or more of: extractor fans, hydraulic systems, heating systems, ventilation systems, lubrication systems, drive systems, automation devices, sensors, and measuring devices; and
    a controller storing in non-transitory computer-readable media instructions executable by the controller to:

stop the operation of the rolling train in response to a fault occurrence;

identify a type of fault occurrence causing an unplanned rolling pause, the type of fault occurrence including one or more of: a roll replacement, a strip breakage, an electrical fault, and a mechanical fault;

determine a probable duration of the unplanned rolling pause corresponding to the type of fault identified;

select one or more of the plurality of additional installation components for powering down based at least in part on the probable duration of the rolling pause and an expected time required to power down and power up the respective installation component; and power down the selected one or more additional installation components.

8. The rolling mill of claim 7, wherein the controller is configured to power down the selected one or more additional installation components into energy-saving mode by shutting them off.

9. The rolling mill of claim 7, wherein the controller is configured to power down the selected one or more additional installation components into energy-saving mode by reducing their power consumption.

10. The rolling mill of claim 9, wherein a mass flow is conveyed through the selected one or more additional installation components, and wherein the controller is configured to power down the selected one or more additional installation components into energy-saving mode by reducing the mass flow conveyed through them.

11. The rolling mill of claim 7, wherein the controller is configured to automatically power a number of selected one or more additional installation components down and up using a single control command.

12. The rolling mill of claim 7, wherein the controller is configured to automatically power up the selected one or more additional installation components that are in energy-saving mode at the end of the rolling pause.

13. A non-transitory storage medium storing computer-readable instructions for controlling a rolling mill installation comprising a one-piece or multi-piece rolling train and a plurality of additional installation components associated with the rolling train and executable by a processor to:

monitoring the rolling train and the plurality of additional installation components for a fault occurrence;

stop the operation of the one-piece or multi-piece rolling train in response to a fault occurrence;

identify a type of fault occurrence causing an unplanned rolling pause, the type of fault occurrence including one or more of: a roll replacement, a strip breakage, an electrical fault, and a mechanical fault;

determine a probable duration of the unplanned rolling pause corresponding to the type of fault identified based on empirical data captured in previous fault occurrences;

automatically select one or more of the plurality of additional installation components for powering down based at least in part on the probable duration of the rolling pause;

wherein the plurality of additional installation components includes one or more of: extractor fans, hydraulic systems, heating systems, ventilation systems, lubrication systems, drive systems, automation devices, sensors, and measuring devices; and automatically power down the selected one or more additional installation components.

* * * * *